(12) United States Patent
Sinde

(10) Patent No.: US 10,498,440 B2
(45) Date of Patent: Dec. 3, 2019

(54) NETWORK TEST INSTRUMENT SUPPORTING HYBRID FIBER COAX AND RF OVER GLASS INSTALLATIONS AND METHOD OF USING SAME

(71) Applicant: VIAVI SOLUTIONS, INC., San Jose, CA (US)

(72) Inventor: Gary W. Sinde, Indianapolis, IN (US)

(73) Assignee: VIAVI SOLUTIONS, INC., San Jose, CA (US)

( * ) Notice: Subject to any disclaimer, the term of this patent is extended or adjusted under 35 U.S.C. 154(b) by 327 days.

(21) Appl. No.: 15/290,483

(22) Filed: Oct. 11, 2016

(65) Prior Publication Data

US 2017/0104527 A1 Apr. 13, 2017

Related U.S. Application Data

(60) Provisional application No. 62/240,078, filed on Oct. 12, 2015.

(51) Int. Cl.
| | | |
|---|---|---|
| H04B 10/08 | (2006.01) | |
| H04B 17/00 | (2015.01) | |
| H04B 10/079 | (2013.01) | |
| G01M 11/00 | (2006.01) | |
| H04B 10/2575 | (2013.01) | |

(52) U.S. Cl.
CPC ......... *H04B 10/0795* (2013.01); *G01M 11/00* (2013.01); *H04B 10/25751* (2013.01)

(58) Field of Classification Search
USPC ...................................................... 356/73.1
See application file for complete search history.

(56) References Cited

U.S. PATENT DOCUMENTS

| | | | | |
|---|---|---|---|---|
| 2003/0204611 A1* | 10/2003 | McCosh | ............... | H04L 43/50 709/230 |
| 2006/0291865 A1* | 12/2006 | Margaritis | ......... | H04B 10/1125 398/135 |
| 2007/0107034 A1* | 5/2007 | Gotwals | ............... | H04H 20/12 725/129 |
| 2008/0048882 A1* | 2/2008 | Paugh | .................. | H04B 15/00 340/870.02 |
| 2009/0154369 A1* | 6/2009 | Helvig | ............... | H04L 12/2801 370/252 |
| 2010/0215362 A1* | 8/2010 | Shimoosako | ...... | H04Q 11/0067 398/25 |
| 2011/0058813 A1* | 3/2011 | Boyd | .................. | H04L 12/413 398/68 |
| 2011/0274426 A1* | 11/2011 | Yang | .................. | H04B 10/071 398/16 |
| 2012/0213259 A1* | 8/2012 | Renken | ............. | H04N 7/17309 375/222 |

(Continued)

OTHER PUBLICATIONS

ShinewayTech, "XGT-200 Tester", Sep. 13, 2014, All pages.*

*Primary Examiner* — David C Payne
*Assistant Examiner* — Pranesh K Barua
(74) *Attorney, Agent, or Firm* — DLA Piper LLP (US)

(57) ABSTRACT

A test instrument for testing RF and RFOG installations is disclosed. The test instrument is configured to test RFoG downstream power and recover an original RF signal from an optical signal generated at a head end and perform DOCSIS and RF signal tests including level, scan, carrier to noise, digital MER/BER, and full communication with CMTS.

17 Claims, 4 Drawing Sheets

(56) References Cited

U.S. PATENT DOCUMENTS

| | | | |
|---|---|---|---|
| 2013/0007520 A1* | 1/2013 | Giammarresi | G06F 11/2294 714/32 |
| 2014/0310604 A1* | 10/2014 | Kahkoska | H04L 41/22 715/736 |
| 2015/0062562 A1* | 3/2015 | Kassler | G01M 11/3136 356/73.1 |
| 2015/0086194 A1* | 3/2015 | Kassler | H04B 10/0773 398/28 |
| 2015/0138996 A1* | 5/2015 | Ince | H04L 43/50 370/252 |
| 2015/0365177 A1* | 12/2015 | Blumenthal | H04B 10/40 398/9 |
| 2016/0041065 A1* | 2/2016 | L'Heureux | G01M 11/3136 356/73.1 |
| 2016/0356670 A1* | 12/2016 | Brillhart | G01M 11/3136 |
| 2017/0099100 A1* | 4/2017 | Bush | H04B 10/25751 |

* cited by examiner

NETWORK TEST INSTRUMENT SUPPORTING HYBRID FIBER COAX AND RF OVER GLASS INSTALLATIONS AND METHOD OF USING SAME

This application claims priority under 35 U.S.C. § 119 to U.S. Patent Application Ser. No. 62/240,078, which was filed on Oct. 12, 2015 and is expressly incorporated herein by reference.

BACKGROUND

As the cable industry moves from hybrid fiber coax ("HFC") to IP based fiber (EPON or GPON), it is preferable to do this in steps to reduce capital expenditures. An incremental step for this is using a technology called Radio Frequency over Glass ("RFOG"). RFOG delivers the same or better performance as coax with reduced noise susceptibility and increased usable RF spectrum in both the downstream and upstream directions. RFOG also allows service providers to continue to leverage traditional HFC equipment and back-office applications as well as installed CPE (customer premise equipment). Cable operators can continue to rely on the existing provision and billing systems, Cable Modem Termination System (CMTS) platforms, headend equipment, set-top boxes, and cable modems while gaining benefits inherent with RFOG.

In RFOG, the coax portion of a cable system is replaced with fiber from the headend to a subscriber's home or other premises. However, the subscriber's premises retains its coax cable and all of the equipment in the home is unaware of the coax to fiber conversion outside. For example, as shown in FIG. 1, an RFOG system 10 has a head end 12 that transmits and receives signals from a subscriber's premises 14 via fiber optic cables 16. As in an HFC system, the subscriber's premises 14 includes coax cables 18 connected to the equipment 20 such as televisions, set-top boxes, and so forth, which are unaware of the fiber optic cables 16.

The RFOG system 10 includes a transmitter 22 and a receiver 24 at the headend 12 that converts all of the RF signals to/from a modulated laser wavelength. An Optical Node Unit ("ONU") 26 located at, for example, the subscriber's premises 14, is used to convert this laser wavelength to RF/coax signals for use in the coax cables 18 and the equipment 20.

SUMMARY

A test instrument or meter that includes circuitry to test RF and RFOG installations is disclosed. The meter is configured to test RFoG downstream power and recover the original RF signal from optical signal and perform DOCSIS and RF signal tests such as level, scan, carrier to noise, digital MER/BER, and full communication with CMTS.

In one embodiment, the technician would first connect the fiber optic drop cable at the side of the home or other subscriber premise to the meter's optical input/output port. The technician would then activate the meter's ONU and measure the optical received power to make sure the cable plant was transmitting in the proper range of −3 dBm to +10 dBm.

Once the downstream wavelength is determined to be in the proper range, the meter can route the ONU's converted RF output into the main RF measurement/DOCSIS engine and perform all standard cable TV tests. Finally, the technician can connect the home's ONU up to the fiber on the side of the house and using the "F" connector on the meter, test all standard cable TV tests at the output of the subscribers' ONU or anywhere in the home.

According to one aspect, a telecommunications network test instrument is disclosed. The test instrument comprises an outer case sized to be carried by a technician, a number of input/output ports extending from the outer case, an optical node unit positioned in the outer case and connected to one of the input/output ports, a first test circuit positioned in the outer case, and a second test circuit positioned in the outer case. The first test circuit is operable to test a first type of network signals, and the second test circuit is operable to test a second type of network signals. A switching circuit is positioned in the outer case. The switching circuit is electrically connected to the optical node unit, the first test circuit, and the second test circuit. A user interface is positioned on the outer case and configured to generate output signals in response to inputs from the technician. The switching circuit is configured to connect the optical node unit to the first test circuit in response to a first output signal from the user interface, and the second test circuit in response to a second output signal from the user interface.

In some embodiments, the first type of network signals include extracted analog and digital audio and video signals of a hybrid fiber coax (HFC) network. Additionally, in some embodiments, the first test circuit may comprise a radio frequency (RF) field programmable gate array (FPGA) operable to process the extracted digital and analog audio and visual signals.

In some embodiments, the second type of network signals are Data-Over-Cable Service Interface Specification (DOCSIS) network signals. Additionally, in some embodiments, the second test circuit may comprise a modem operable to use the DOCSIS network protocol.

In some embodiments, the switching circuit may be a first switching circuit. The test instrument may further comprise a coax cable connector extending from the outer case, and a second switching circuit positioned in the outer case that is electrically connected to the coax cable connector and the optical node unit. The second switching circuit may be configured to selectively connect the optical node unit to the coax cable connector in response to a third output signal from the user interface.

In some embodiments, the second switching circuit may be electrically connected to the first switching circuit. The second switching circuit may be configured to selectively connect the optical node unit to the first switching circuit in response to a fourth output signal from the user interface.

Additionally, in some embodiments, the test instrument may comprise a control circuit operable to receive output signals from the user interface and generate control signals to operate the switching circuit. In some embodiments, the control circuit may be configured to measure downstream power based on signals received by the optical node unit.

In some embodiments, the optical node unit may be connected to a fiber optic cable input/output port. In some embodiments, the test instrument may comprise an Ethernet field programmable gate array (FPGA) electrically connected to an Ethernet input/output port of the number of input/output ports extending from the outer case and the optical node unit.

In some embodiments, the test instrument may further comprise a first circuit board having the first test circuit, the second test circuit, and the switching circuit arranged thereon, and a second circuit board including the optical node unit. In some embodiments, the user interface may include a display screen.

According to another aspect, a telecommunications network test instrument comprises an outer case sized to be carried by a technician, an optical node unit positioned in the outer case and connected to an input/output port extending from the outer case, a first test circuit positioned in the outer case, and a second test circuit positioned in the outer case. The first test circuit is operable to process extracted analog and digital audio and video signals, and the second test circuit is operable to process DOCSIS signals. A control circuit is configured to measure downstream power based on signals received by the optical node unit via the input/output port, perform analog and digital signal tests on signals received from the first test circuit, and perform DOCSIS signal tests on signals received from the second test circuit.

In some embodiments, the test instrument may comprise a coax cable connector extending from the outer case. The control circuit is configured to generate control signals to connect the optical node unit to the coax cable connector.

In some embodiments, the test instrument may further comprise one or more switching circuits to selectively connect the optical node unit to one of the coax cable connector, the first test circuit, and the second test circuit. Additionally, in some embodiments, the optical node unit may be connected to a fiber optic cable input/output port.

BRIEF DESCRIPTION OF THE DRAWINGS

The invention may best be understood by referring to the following detailed description and accompanying drawings. In the drawings.

DETAILED DESCRIPTIONS OF ILLUSTRATIVE EMBODIMENTS

Figure 1:
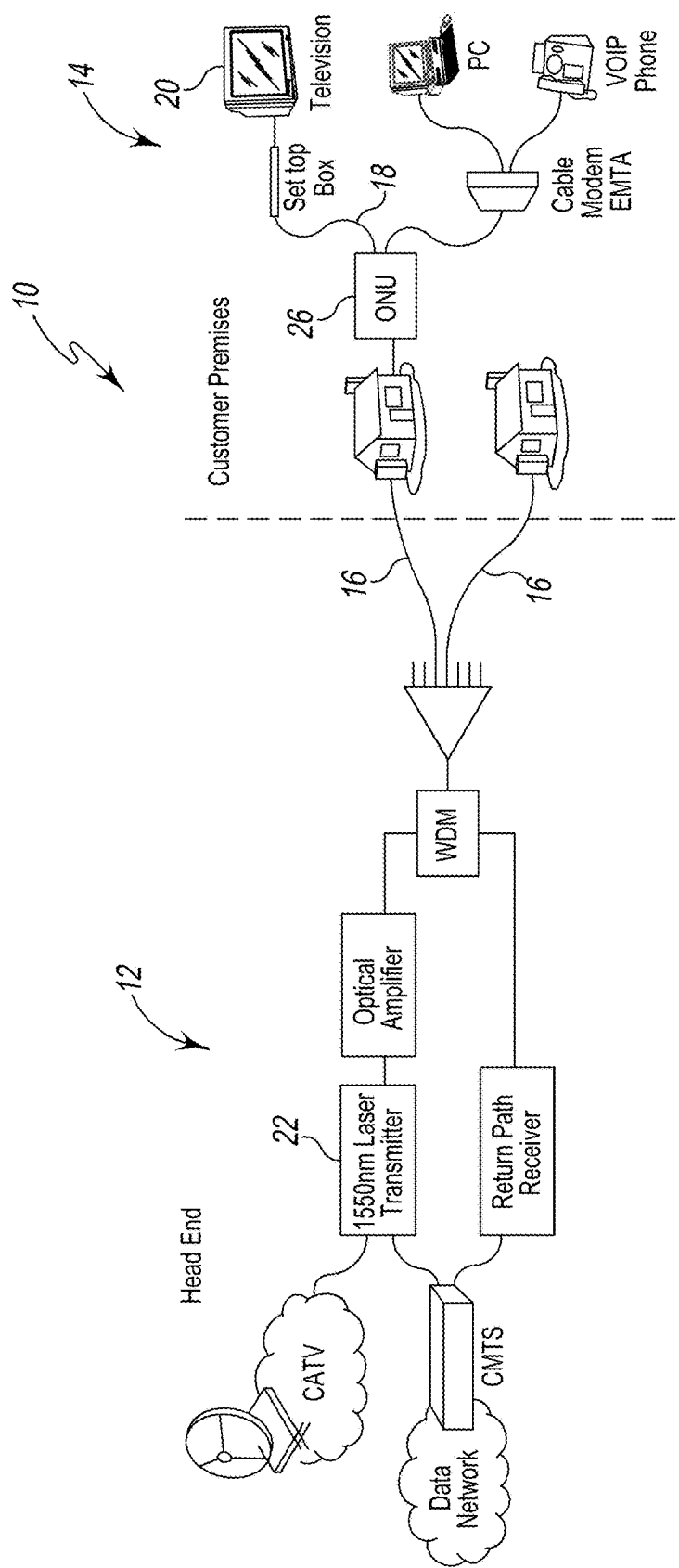
FIG. 1 illustrates a typical RF over Glass (RFOG) system.
Figure 2:
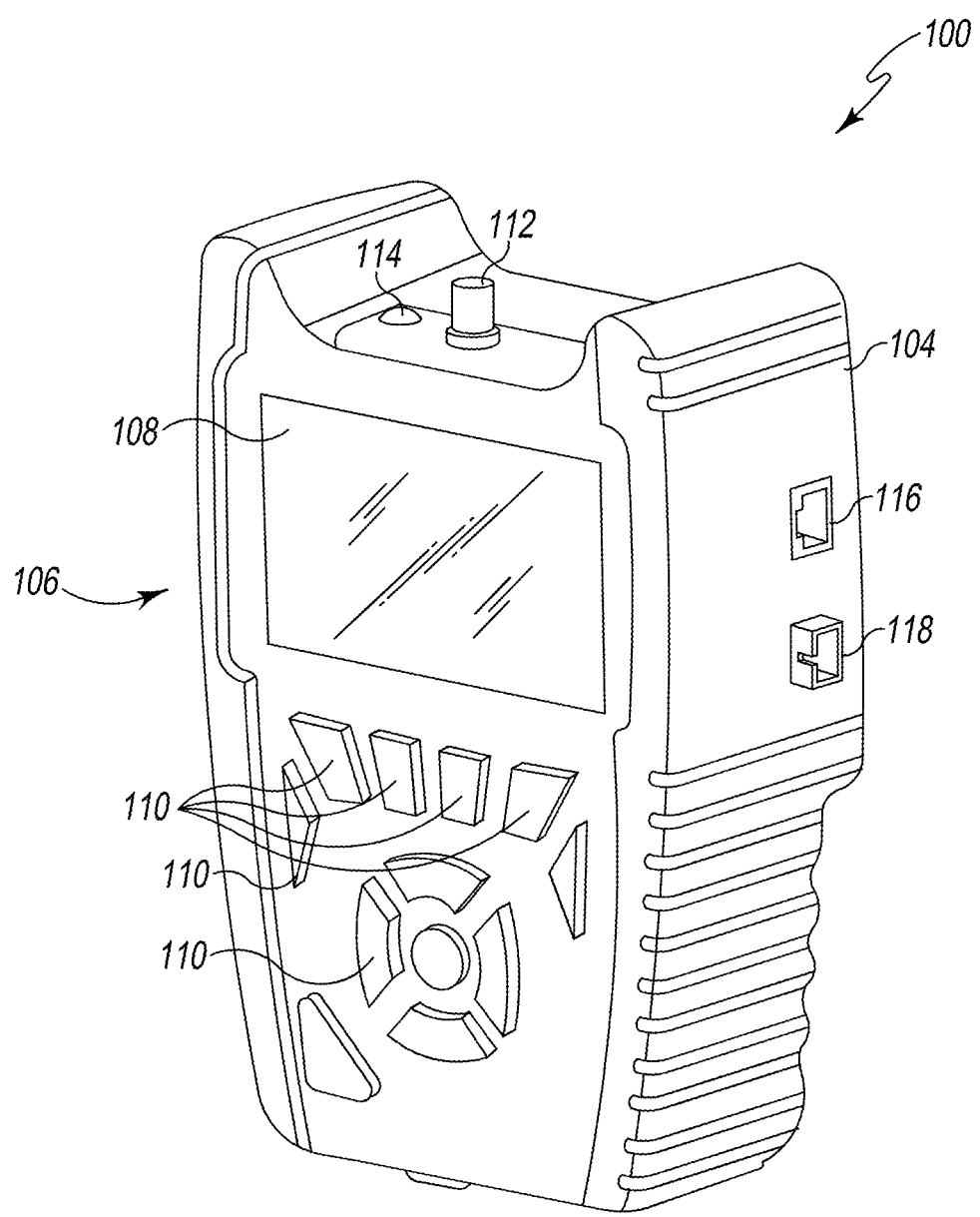
FIG. 2 is a perspective view of an embodiment of a test instrument for use with the system of FIG. 1.

Referring now to FIG. 2, a test instrument or meter 100 configured to support existing HFC RF and Data-Over-Cable Service Interface Specification (DOCSIS) 3.1 installation testing is shown. The test instrument 100 is also configured to support RFOG installation testing. In the illustrative embodiment, the meter 100 includes an Optical Node Unit ("ONU") 138 (see FIG. 3) to facilitate and support RFOG installation testing.

The meter 100 includes an outer case 104 that houses the ONU 138 and the other electronic components of the meter 100. A user interface 106 including a display 108 and a number of input buttons 110 operable to control the meter 100 is positioned on a front panel of the outer case 104. In the illustrative embodiment, the display 108 is a touch screen, which permits the user to access and view different functions of the meter 100. The meter 100 also includes a speaker (not shown) to provide the technician with audible indications during testing.

The meter 100 also includes an RF connector 112 and a flashlight 114 positioned on the top panel of the meter 100. The RF connector 112 is configured to be received in a standard F-connector for a coax cable such that the meter 100 may be connected to televisions, set-up boxes, and other equipment on the subscriber's premises 14.

A pair of input/output ports 116, 118 are positioned on a side panel of the meter 100. The port 116 is an Ethernet port configured to receive the connector of an Ethernet cable. It should be appreciated that the Ethernet port may be an electrical or optical Ethernet port. The other port 118 is an optical port configured to provide an RFOG input/output connection. In the illustrative embodiment, the port 118 is configured to receive an SC/APC connector such that the meter 100 may be connected to, for example, the fiber optic drop cable at the subscriber's premises 14.

Figure 3:
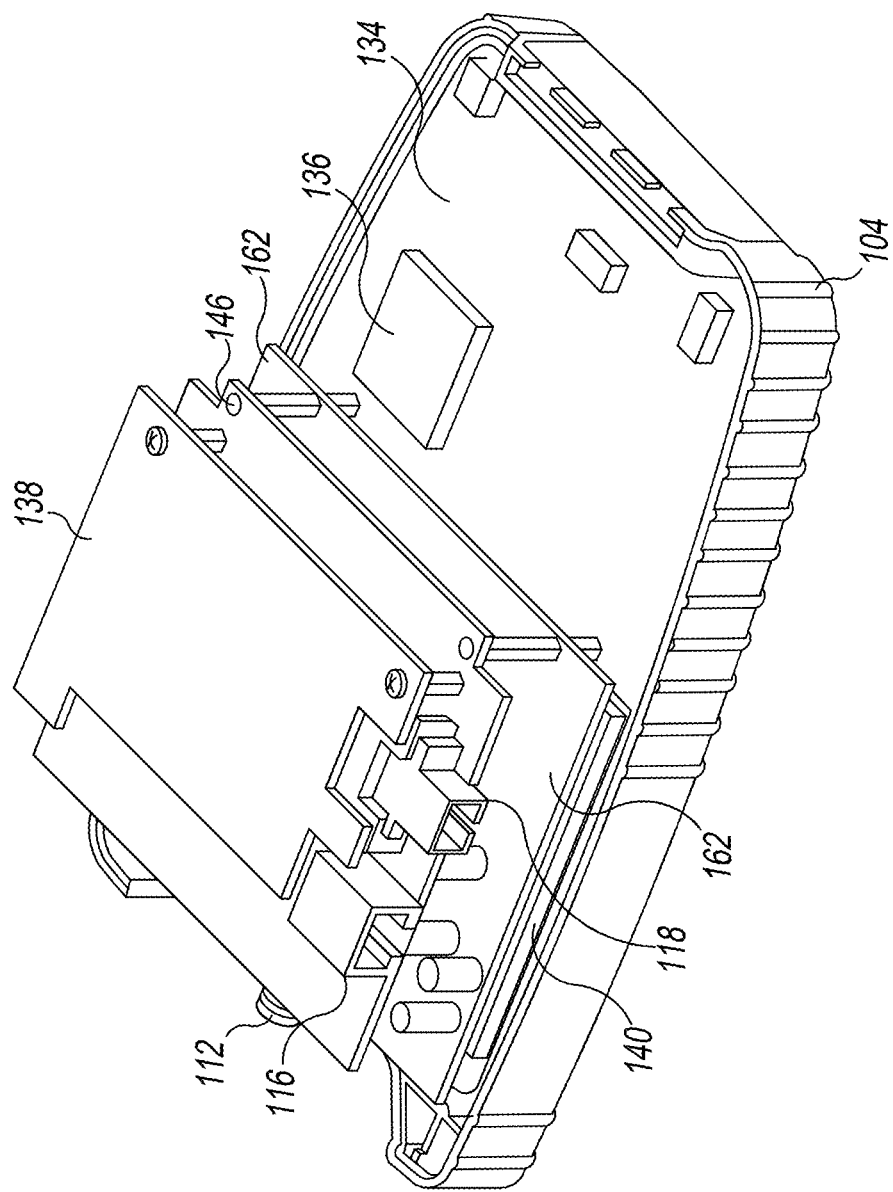
FIG. 3 is a rear perspective view of the instrument of FIG. 2 illustrating some of the internal components of the instrument.

Referring now to FIG. 3, the meter 100 includes a number of circuit boards 130 operable to process signals transmitted and received through, for example, the connector 112 and the ports 116, 118. The circuit boards 130 include a Central Processing Unit (CPU) board 132, which includes the CPU 134 of the meter 100. In the illustrative embodiment, the CPU is a microprocessor that is operable to receive, directly or indirectly, electrical signals from the other circuit boards 130 and other electronic components of the meter 100. A wireless circuit board 136 is connected to the CPU board 132 to facilitate wireless communication between the meter 100 and other devices.

Figure 4:
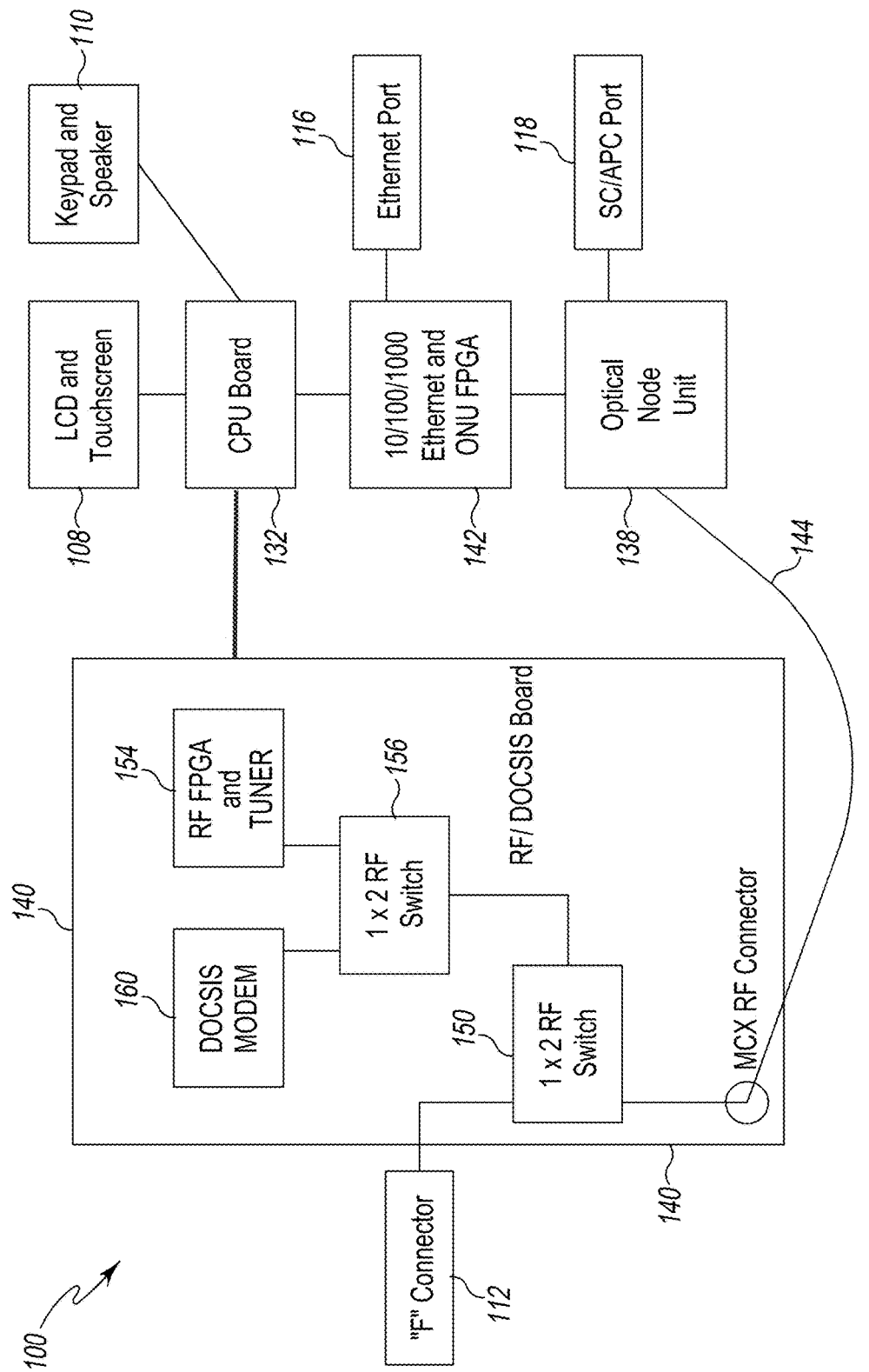
FIG. 4 illustrates a block schematic of the instrument of FIGS. 2-3.

The meter 100 also includes an ONU board 138, which includes the circuitry necessary to process optical signals received through the I/O port 118. As shown in FIG. 4, the ONU board 138 is connected digitally the CPU board 132 and separately connected to a measurement board 140. In the illustrative embodiment, a 10/100/1000 Ethernet FPGA 142 provides the digital connection to the CPU board 132. A mini coax cable 144 connects the ONU board 138 to the measurement board 140.

In the illustrative embodiment, the 10/100/1000 Ethernet FPGA 142 is included on a separate communication board 146 that is positioned between the ONU board 138 and the other circuit boards 130, as shown in FIG. 3. The communication board 146 is electrically connected to the Ethernet I/O port 116 and the CPU board 132.

As shown in FIG. 4, the ONU board 138 may be connected to the RF connector 112 via a switch 150. In the illustrative embodiment, the switch 150 is a 1×2 RF switch located on the measurement board 140 and electrically operated by the CPU board 132. The switch 150 is operable to selectively connect the ONU board 138 to the RF connector 112 or the other components coupled to the measurement board 140, as described in greater detail below.

The measurement board 140 is positioned adjacent to CPU board 132 in the case 104. In addition to being connected to the RF connector 112 and the ONU board 138, the measurement board 140 is electrically connected to the CPU board 132. As described above, the measurement board 140 includes the switch 150; as shown in FIG. 4, the board 140 also includes an RF Field Programmable Gate Array ("RF FPGA") 154 that is connected to the switch 150 via another switch 156. In the illustrative embodiment, the switch 156 is a 1×2 RF switch located on the measurement board 140 and electrically operated by the CPU board 132. The switch 156 is operable to selectively connect the RF FPGA 154 to the switch 150 and hence the RF connector 112 and/or ONU 138, as described in greater detail below. The RF FPGA 154 is operable to test installations using HFC such as, for example, analog and digital audio and visual signals that have been extracted by the ONU.

The meter 100 also includes a DOCSIS modem 160 that is operable to test installations using the Data-Over-Cable Service Interface Specification protocol. The modem 160 is located on a circuit board 162 positioned between the ONU board 138 and the measurement board 140 in the case 104.

The DOCSIS modem 160 is connected to the switch 150 via the switch 156 to permit the DOCSIS modem 160 to be selectively connected to the RF connector 112 and/or ONU 138, as described in greater detail below.

The CPU board 132 is configured to receive digital signals from the RF FPGA 154 and the modem 160. The technician may utilize the user interface 106 to review and analyze those signals. The CPU board 132 is configured to process the signals to conduct a number of tests, including signal level, frequency scanning, and carrier to noise analysis. The CPU board 132 is also configured to analyze the digital Modulation Error Ratio and the Bit Error Ratio (MER/BER) in the system and evaluate full communication with CMTS.

In use, a technician would connect the fiber optic drop cable at the side of the premises 14 to the I/O port 118. The technician would then use the user interface 106 to cause the meter 100 to measure the optical received power to make sure the cable plant was transmitting in the proper range of −3 dBm to +10 dBm.

Once the downstream wavelength is determined to be in the proper range, the technician may use the user interface 106 to configure the meter 100 to test the RFOG installation. To do so, the technician would use the buttons 110 and/or display 108 to send commands to the CPU board 132. The CPU board 132 would process the command signals received from the user interface 106 and operate the switches 150, 156 to connect the ONU board 138 to the RF FPGA 154, the modem 160, or the RF connector 112. The meter 100 can route the converted RF output of the ONU 138 into the RF FPGA 154 or the modem 160 to perform all standard cable TV tests. Alternatively, the technician may connect the home's ONU 26 up to the fiber on the side of the premises 14 and using the connector 112 on the meter 100, test all standard cable TV tests at the output of the subscribers ONU or anywhere in the home.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There is a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims

The invention claimed is:

1. A telecommunications network test instrument comprising:
   an outer case sized to be carried by a technician,
   a number of input/output ports extending from the outer case,
   an optical node unit positioned in the outer case and connected to one of the input/output ports,
   a first test circuit positioned in the outer case, the first test circuit being operable to test a first type of network signals,
   a second test circuit positioned in the outer case, the second test circuit being operable to test a second type of network signals,
   a switching circuit positioned in the outer case, the switching circuit being electrically connected to the optical node unit, the first test circuit, and the second test circuit, and
   a user interface positioned on the outer case and configured to generate output signals in response to inputs from the technician,
   wherein the first type of network signals includes analog and digital audio and video signals extracted from a hybrid fiber coax (HFC) network, and
   wherein the switching circuit is configured to connect the optical node unit to (i) the first test circuit in response to a first output signal from the user interface, and (ii) the second test circuit in response to a second output signal from the user interface.

2. The network test instrument of claim 1, wherein the first test circuit comprises a radio frequency (RF) field programmable gate array (FPGA) operable to process the extracted digital and analog audio and visual signals.

3. The network test instrument of claim 1, wherein the second type of network signals are Data-Over-Cable Service Interface Specification (DOCSIS) network signals.

4. The network test instrument of claim 3, wherein the second test circuit comprises a modem operable to use the DOCSIS network protocol.

5. A network test instrument comprising:
   an outer case sized to be carried by a technician,
   a user interface positioned on the outer case and configured to generate output signals in response to inputs from the technician,
   a coax cable connector extending from the outer case,
   a number of input/output ports extending from the outer case,
   an optical node unit positioned in the outer case and connected to one of the input/output ports,
   a first test circuit positioned in the outer case, the first test circuit being operable to test a first type of network signals,
   a second test circuit positioned in the outer case, the second test circuit being operable to test a second type of network signals,
   a first switching circuit positioned in the outer case, the first switching circuit being electrically connected to the optical node unit, the first test circuit, and the second test circuit, wherein the first switching circuit is configured to connect the optical node unit to (i) the first test circuit in response to a first output signal from the user interface, and (ii) the second test circuit in response to a second output signal from the user interface, and
   a second switching circuit positioned in the outer case that is electrically connected to the coax cable connector and the optical node unit, the second switching circuit being configured to selectively connect the optical node unit to the coax cable connector in response to a third output signal from the user interface.

6. The network test instrument of claim 5, wherein the second switching circuit is electrically connected to the first switching circuit, and the second switching circuit is configured to selectively connect the optical node unit to the first switching circuit in response to a fourth output signal from the user interface.

7. The network test instrument of claim 1, further comprising a control circuit operable to receive the output signals from the user interface and generate control signals to operate the switching circuit.

8. The network test instrument of claim 7, wherein the control circuit is configured to measure downstream power based on signals received by the optical node unit.

9. The network test instrument of claim 1, wherein the optical node unit is connected to a fiber optic cable input/output port.

10. The network test instrument of claim 1, further comprising an Ethernet field programmable gate array (FPGA) electrically connected to an Ethernet input/output port of the number of input/output ports extending from the outer case and the optical node unit.

11. The network test instrument of claim 1, further comprising:
a first circuit board having the first test circuit, the second test circuit, and the switching circuit arranged thereon, and
a second circuit board including the optical node unit.

12. The network test instrument of claim 1, wherein the user interface includes a display screen.

13. A telecommunications network test instrument comprising:
an outer case sized to be carried by a technician,
a coax cable connector extending from the outer case,
an optical node unit positioned in the outer case and connected to an input/output port extending from the outer case,
a first test circuit positioned in the outer case, the first test circuit being operable to process extracted analog and digital audio and video signals,
a second test circuit positioned in the outer case, the second test circuit being operable to process Data-Over-Cable Service Interface Specification (DOCSIS) signals, and
a control circuit configured to (i) measure downstream power based on signals received by the optical node unit via the input/output port, (ii) perform analog and digital signal tests on signals received from the first test circuit, (iii) perform DOCSIS signal tests on signals received from the second test circuit, and (iv) generate control signals to connect the optical node unit to the coax cable connector.

14. The network test instrument of claim 13, wherein the first test circuit comprises a radio frequency (RF) field programmable gate array (FPGA).

15. The network test instrument of claim 13, wherein the second test circuit comprises a modem operable to use the DOCSIS network protocol.

16. The network test instrument of claim 13, further comprising one or more switching circuits to selectively connect the optical node unit to one of the coax cable connector, the first test circuit, and the second test circuit.

17. The network test instrument of claim 13, wherein the optical node unit is connected to a fiber optic cable input/output port.

* * * * *